United States Patent [19]

Mathiasen

[11] Patent Number: 4,551,584

[45] Date of Patent: Nov. 5, 1985

[54] EARPHONE SET

[75] Inventor: Herluf S. Mathiasen, Virum, Denmark

[73] Assignee: Bang & Olufsen A/S, Struer, Denmark

[21] Appl. No.: 600,160

[22] Filed: Apr. 13, 1984

[30] Foreign Application Priority Data

Apr. 15, 1983 [DK] Denmark .............................. 1652/83

[51] Int. Cl.[4] .............................................. H04M 1/05

[52] U.S. Cl. ..................................... 179/156 R; 2/209

[58] Field of Search ........... 179/156 R, 156 A, 182 R, 179/182 A; 381/25, 74; 2/209; D14/36

[56] References Cited

U.S. PATENT DOCUMENTS

| | | | |
|---|---|---|---|
| 1,579,412 | 4/1926 | Stenberg | 179/156 R |
| 4,404,434 | 9/1983 | Pelt et al. | 179/156 R |

FOREIGN PATENT DOCUMENTS

| | | | |
|---|---|---|---|
| 439808 | 2/1975 | Fed. Rep. of Germany | 179/156 R |
| 213519 | 4/1974 | United Kingdom | 179/156 R |

*Primary Examiner*—Gene Z. Rubinson
*Assistant Examiner*—Danita R. Byrd
*Attorney, Agent, or Firm*—Antonelli, Terry & Wands

[57] ABSTRACT

An earphone set is provided with a temple pad above each of its earphone units, whereby the pressure against the ear is relieved by an additional holding pressure against the temple region. In order to be self adjustable for an optimal pressure distribution the earphone unit and the temple pad are mounted, in each side, on a common carrier member, which is pivoted to the end of the resilient headband about a pivot axis located between the earphone unit and the temple pad.

4 Claims, 6 Drawing Figures

EARPHONE SET

BACKGROUND AND SUMMARY OF THE INVENTION

The present invention relates to earphone sets of the type having a resilient headband as carrying at one or preferably both ends thereof an earphone, which is held against the ear by the resilient pressure of the headband. In order to be properly held on the user's head the earphone device should clamp about the head with a considerable pressure, and it has been experienced that the necessary pressure is in fact inconvenient for the user, when the pressure is exerted directly against the ears only. One manner of overcoming this problem is to provide each earphone with a surrounding pressure pad, which, in use, will encircle the ear and bear against the side of the head all around the ear, whereby the ear will also be sound insulated from the surroundings. This should be believed to be an advantage for the listening person, but most listeners, nevertheless, prefer to be able to still have a chance to hear external sounds, and besides, the ear surrounding pressure pad is liable to heat insulate the ear and therewith cause the ears to be inconveniently warm.

More specifically, therefore, the invention relates to an earphone set of the type in which the earphones are designed so as to be rested directly against the outer ear of the user. This type was known long before the above ear surrounding pressure pad type, and originally the earphones had an ear engaging member made of a hard material. In modern earphone sets the earphones are covered by a resilient pad made of a foam material having open cells, such that the sound can easily be transmitted through the pad, which, due to its resiliency, will contact the outer ear with a well distributed and thus locally low pressure. This pressure, however, is still inconveniently high when it should be sufficient to generally stabilize the earphone set on the user's head.

It has already been proposed, therefore, to provide the ends of the resilient headband with pressure pads for engaging the temple area of the user's head just above the ears, whereby the earphone set is held on the user's head primarily by the associated temple pressure, such that the pressure of the earphone against the outer ear can be relieved or even eliminated. It is still desirable, however, that the earphones should be in close contact with the ears, and because of the different ear and head shapes of the potential users it has been suggested, therefore, to arrange the earphones in such a manner that they are adjustable towards and out from the ear relative the position of the temple pressure pad portion.

Such an adjustment, of course, is easily achievable by some kind of a screw spindle or other adjustable arrangement between the earphone and its associated end of the headband or between the headband and the temple pressure pad. An associated disadvantage is that an earphone set, once adjusted to one person, rarely will be conveniently adjusted to another person having access to the same set, and that the presence of the adjustment arrangement tends to be a difficulty for a neat design of the set.

On this background it is the purpose of the invention to provide an earphone set, the earphones of which are arranged so as to be self-adjusting, in an operationally acceptable and constructionally simple manner.

According to the invention the earphone and the temple pad are mounted on a common carrier member, which is pivotally held by the respective end portion of the headband so as to be pivotal in a plane generally normal to the side of the user's head about an axis located behind and between the active head engaging areas of the earphone and the temple pad. The resilient pressure of the headband end will hereby be transferred to the head through a two-armed lever, with respective leverages as given by the relative position of the pivot axis. The resilient pressure force, therefore, will be distributed accordingly between the ear and the temple, and this distribution will be substantially independent of the angular position of the said carrier member relative the end portion of the headband, i.e. independent of the engagement surface of the outer ear being spaced more or less from the side of the head.

It has been found that it is possible to locate the pivot axis such that an ear set will satisfy a wide variety of users, i.e. the set may be produced as a standard article for general use. On the other hand it will be easy to provide for some adjustability of the location of the pivot axis, whereby the user may decide, personally, the ratio between the pressure of the earphone and the temple pad, respectively.

The said carrier member may be arranged so as to extend generally in the longitudinal direction of the end portions of the head band, whereby the earphone set can be designed with an attractive appearance.

In the following the invention is described in more detail with reference to the drawings.

DETAILED DESCRIPTION OF THE DISCLOSED EMBODIMENTS

Figure 1:
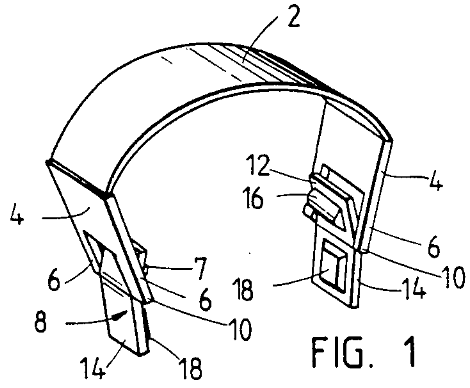
FIG. 1 is a perspective view of an earphone set according to the invention.

The earphone set shown in FIG. 1 comprises a resiliently flexible headband 2 having at each end a rigidly fastened end portion 4, the lower half of which is bifurcated so as to show two opposed fingers 6. Between these fingers is mounted a plate shaped carrier member 8, which is freely pivotal about a pivot pin 10 as provided between the outer ends of the fingers 6. The pin 10 extends through a middle portion of the carrier member 8, such that an upper half 12 of the carrier member is receivable between the fingers 6 while a lower half 14 projects further downwardly.

On the upper half 12 of the carrier member 8 is mounted a temple pad 16, and on the lower half 14 is mounted an earphone unit 18. In a manner not shown each of the opposed earphone units 18 is connected with an electric cable, i.e. the earphone set is connected with two separate cables, which may of course be joined in some distance from the set.

Figure 2:
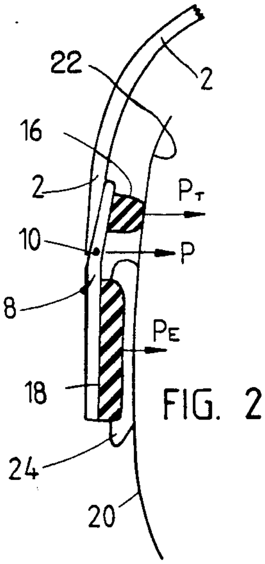
FIG. 2 is a schematic view illustrating the distribution of the head clamping forces.

In FIG. 2 is schematically shown one side of a listener's head 20, the temple area being designated 22 and the outer ear 24. The listener has placed the earphone set such that the earphone unit 18 is conveniently engaging the outer ear 24. The headband 2, through the pivot pin 10, applies a clamping force P inwardly towards the head side, and by this force the carrier member 8 will be brought to contact both the outer ear, through the earphone unit 18, and the temple, through the temple pad 16. The force P will thus be split into a force $P_E$ as applied by the earphone unit 18 against the ear and a force $P_T$ as applied by the temple pad 16 against the temple area 22. The ratio between the forces $P_E$ and $P_T$, according to elementary geometry, will depend on the relative location of the force P, and in the example shown, in which the pivot pin 10 is located closer to the temple pad 16 than to the center of the earphone unit 18, the force $P_T$ will be bigger than the force $P_E$. However, even if $P_E$ was bigger than $P_T$, the ear pressure $P_E$ would still be smaller than P.

Thus, the clamping force P is divided into a reduced ear pressure force $P_E$ and a reduced temple pressure force $P_T$, and the earphone set will be held on the listener's head by the sum of the forces $P_E$ and $P_T$, of which the ear engaging force $P_E$ is small enough to be convenient to the listener, whose head is better suited to resist the temple pressure $P_T$. It will be understood that for the distribution of the forces $P_E$ and $P_T$ it will be practically entirely unimportant whether the carrier member 8 assumes the angular position shown in FIG. 2 or any angular position slightly deviating therefrom, i.e. the carrier member will automatically adjust itself to assume a position in which the forces $P_E$ and $P_T$ are applied to the head of the listener, irrespective of the horizontal distance between the outer surfaces of the outer ear and the temple region, respectively.

Figure 3:
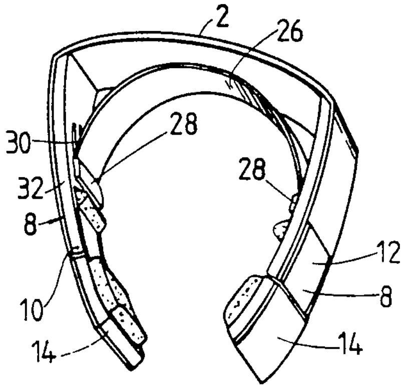
FIG. 3 is a perspective view of a modified earphone set, shown out of use.
Figure 4:
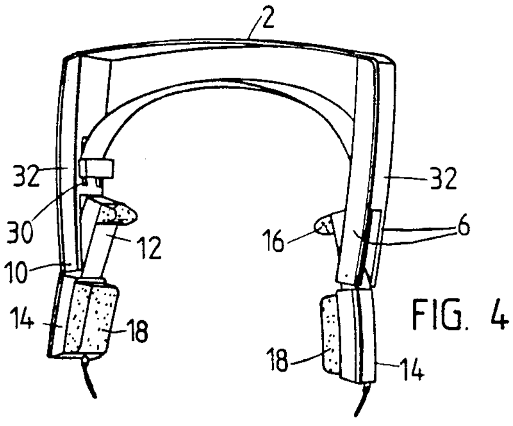
FIG. 4 is a perspective view of the earphone set of FIG. 3, shown in a position of use.

FIGS. 3 and 4 show a practical example of an earphone set designed in accordance with FIGS. 1 and 2. The general design is the same except that a flexible crown band 26 has been added. In a manner known per se the crown band is provided with opposed end blocks 28, which, through slots 30 in the inner wall of a respective side member 32, is connected with another, spring loaded block member (not shown) inside said side member, such that the end blocks are generally downwardly biased and slidable along the slots 30. In use the crown band 26, therefore, will act as a self adjusting carrier and stabilizer member.

Figure 5:
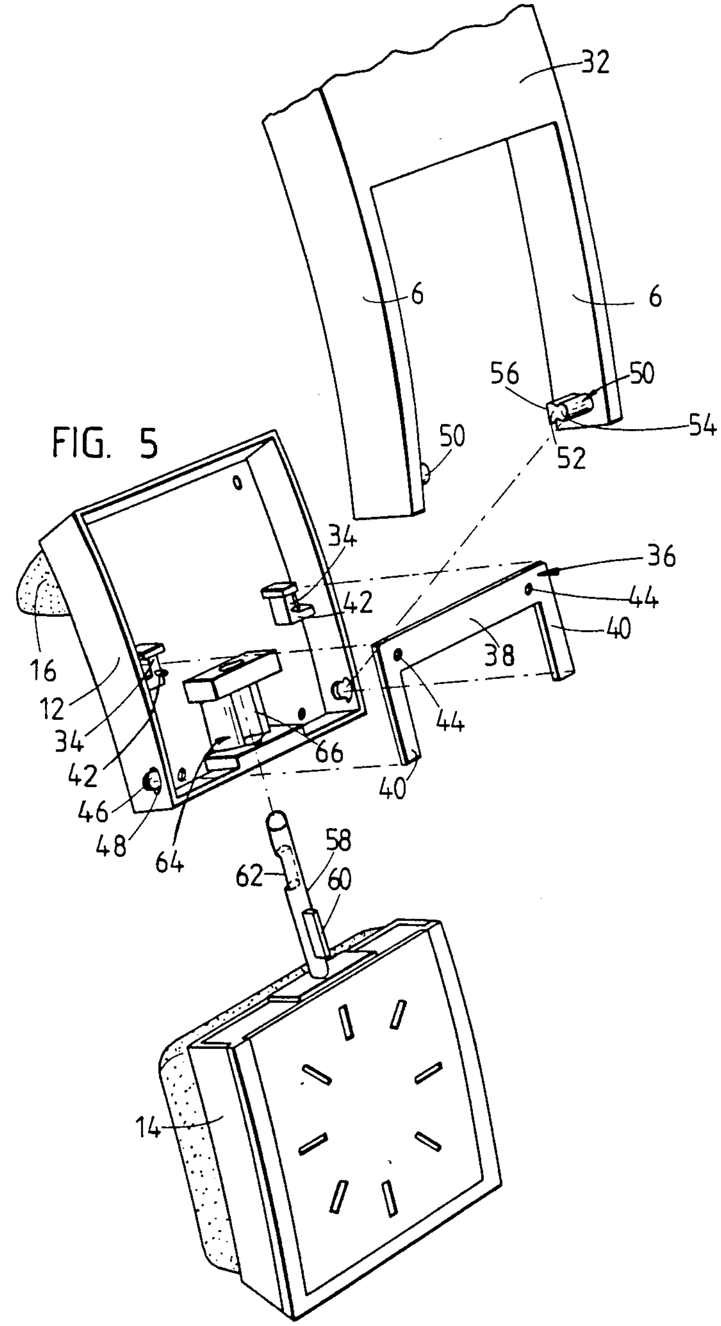
FIG. 5 is an exploded detailed view of an earphone/-temple pad assembly of the set according to FIGS. 3 and 4.
Figure 6:
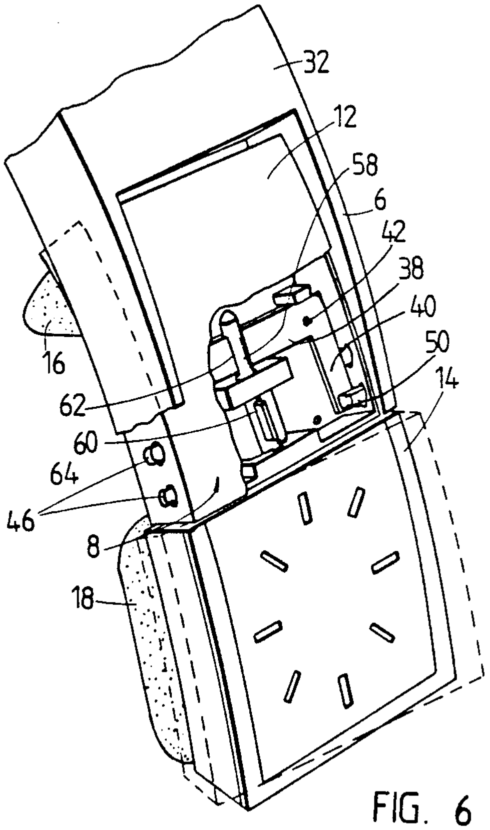
FIG. 6 is a schematic view of a further modified earphone set according to the invention.

In the embodiment of FIGS. 3 and 4 it is a special feature that the carrier member 8 is slightly biased such that in its free condition it will seek to assume the position according to FIG. 3, i.e. almost in line with the side member 32. Another special feature is that the earphone carrying lower half 14 of the carrier member 8 is slightly rotatable about a vertical axis so as to be able to adapt itself to the horizontal direction of the natural outer plane of the listener's outer ear, while also with respect to such rotation the lower portion 14 of the carrier member is biased towards the position shown in FIG. 3. The associated detailed arrangement is illustrated in FIGS. 5 and 6:

The upper portion 12 of the carrier member 12,14 is a hollow box, the back cover of which is shown as being removed in FIG. 5. Inside the box is arranged, integrally, a pair of opposed support blocks 34 for supporting the corner portions of a generally U-shaped leaf spring 36 as formed by a cross portion 38 and two leg portions 40. The blocks 34 have guiding pins 42 cooperating with holes 44 in the leaf spring. At their lower ends the side panels of the box are each provided with a hole 46 having an outwardly widened hole segment 48. The fingers 6 of the headband side member 32 are provided with pivot pins 50, which are receivable in the holes 44 upon the fingers 6 being spread resiliently.

The pivot pins 50 each have a basic cylindrical portion 52 which fits into one of the holes 46 and a segment portion 54 receivable with circumferential play in the widened hole segment 48 of the hole 46 such that the box portion 12 will be pivotable inwardly from the neutral position as shown in FIG. 3 to the relative position shown in FIG. 4 and also correspondingly pivotable outwardly from the side member 32.

Opposite to the outer segment portions 54 the cylindrical pivot pins 50 are shaped with a planar surface portion 56. When the leaf spring 36 is mounted in the box 12 the outer ends of its leg portions 40 will be located just inside the holes 46 in such a manner that when the pivot pins 50 are introduced through the holes 46 the said surface portion 56 of each pivot pin will engage the outside of the corresponding leaf spring leg 40. The leaf spring, which is clamped and stabilized in its mounted position when the said back cover is mounted on the box, will thus gently resist any pivoting of the box member 12 from the position shown in FIG. 3, since by both outward and inward tilting the pivot pin surfaces 56 will cause a resilient depression of the outer ends of the leg portions 40 of the leaf spring. The spring, therefore, will seek to hold the box member 12 in the position shown in FIG. 3, though with such a low force that the carrier member 8 will readily be pivoted, in use, to accomodate the head shape of the user.

The lower earphone carrying member 14 is a separate unit, which is topwise provided with an upwardly projecting pin 58. This pin has an outwardly protruding, longitudinal rib 60 and, closer to its outer end, an opposed recess 62 showing a retracted planar bottom wall portion. The length of the recess 62 corresponds to the width of the cross portion 38 of the leaf spring 36.

In the upper box member 12 is bottomwise provided a hole for receiving the pin 58 of the lower member 14. Inside the box member 12 is provided, integrally, a socket portion 64 for receiving the innermost length of the pin 58, while the outermost length thereof as including the recess 62 will project beyond the socket portion 64. The said bottom hole in the box member 12 is key hole shaped so as allow for the rib 60 to be introduced therethrough, and the socket portion 64 has a rearwardly open slot 66 allowing for a certain angular movement of the rib 60, once introduced into the socket portion, corresponding to the earphone carrying member 14 being able to pivot to a limited degree about the axis of the pin 58.

When the pin 58 is inserted into and beyond the socket portion 64 the outer, the pointed end of the pin 58 will engage the outside of the cross portion 38 of the mounted leaf spring 36, and this spring cross portion will snap outwardly into the recess 62 when the insertion of the pin is completed. Hereby the pin 58 will be snap locked against retraction such that thereafter the members 12 and 14 will be joined into a commonly pivotable single carrier member 8.

However, the pin 58 is still to some degree rotatable in the socket portion 64, though the cross portion 38 of the leaf spring 36 will get resiliently depressed by the associated turning of the flat bottom surface of the recess 62. In other words, the leaf spring portion 38 will resiliently resist the rotation of the earphone member 14 and will cause the same to assume, relative the member 12 the regular position shown in FIG. 3 and 4 whenever the earphone member is not subjected to forces seeking to rotate it.

FIG. 6 shows the parts of FIG. 5 in their assembled condition, and in dotted lines is shown a slightly turned out position of the earphone member 14.

It is also shown in FIG. 6 that the temple pad carrying member 12 may be provided with more than one hole 46 for selectively receiving the pivot pin 50, such that the ratio between the forces $P_E$ and $P_T$ (FIG. 2) may be adjusted by mounting the pivot pin 50 in a selected one of the holes 46. This is but one example of a possibility of generally arranging for the effective pivot axis 10 in an adjustable manner between the earphone unit 18 and the temple pad 16, but a similar effect, of course, will be achievable by arranging for the distance between the pivot axis 10 and either one or both of the earphone unit and the temple pad to be adjustable, in any suitable manner.

What is claimed is:

1. An earphone set comprising a resilient head band having an earphone carrier portion on at least one of its opposed ends, an elongate carrier member provided with an earphone unit adjacent one end and a temple pad adjacent the other end thereof, and means pivotally connecting said carrier member to said carrier portion about a transverse axis located between the earphone unit and the temple pad.

2. An earphone set according to claim 1, in which means are provided for adjusting the position of said transverse pivot axis for said carrier member such that the distance between the transverse pivot axis and at least one of the earphone unit and the temple pad is adjustable.

3. An earphone according to claim 1, in which the pivotable carrier member is resiliently biased towards a position where the carrier member is substantially in alignment with the associated end portion of the head band.

4. An earphone set according to claim 1, in which the pivotable carrier member comprises a first carrier element provided with said temple pad and a second carrier element provided with said earphone unit, means being provided for coupling said first and second carrier elements together to form said carrier member which is pivotable relative the end of the headband, and wherein said coupling means permits said first and second carrier elements to be rotated with respect to one another about an axis perpendicular to the pivot axis.

* * * * *